United States Patent
Jo et al.

(10) Patent No.: US 11,711,458 B2
(45) Date of Patent: Jul. 25, 2023

(54) METHOD FOR CONTROLLING MOBILE COMMUNICATION DEVICE, AND MOBILE COMMUNICATION DEVICE

(71) Applicants: SAMSUNG DISPLAY CO., LTD., Yongin-si (KR); Inha University Research and Business Foundation, Incheon (KR)

(72) Inventors: Min Gyeong Jo, Suwon-si (KR); Young Chan Kim, Incheon (KR); Gang Il Lee, Incheon (KR); Jung Ho Jeon, Daejeon (KR); Byung Cheol Song, Seoul (KR)

(73) Assignees: Samsung Display Co., Ltd., Yongin-si (KR); Inha University Research and Business Foundation, Incheon (KR)

( * ) Notice: Subject to any disclaimer, the term of this patent is extended or adjusted under 35 U.S.C. 154(b) by 52 days.

(21) Appl. No.: 17/227,348

(22) Filed: Apr. 11, 2021

(65) Prior Publication Data
US 2021/0326591 A1    Oct. 21, 2021

(30) Foreign Application Priority Data
Apr. 21, 2020  (KR) .......................... 10-2020-0047801

(51) Int. Cl.
*G06V 40/18*    (2022.01)
*G06V 40/16*    (2022.01)
(Continued)

(52) U.S. Cl.
CPC ........ *H04M 1/72454* (2021.01); *G06F 18/22* (2023.01); *G06V 40/161* (2022.01);
(Continued)

(58) Field of Classification Search
CPC .... G06V 40/18; G06V 40/161; G06V 40/166; G06V 40/168; G06K 9/6215;
(Continued)

(56) References Cited

U.S. PATENT DOCUMENTS 9,329,682 B2    5/2016  Keaner et al.
2011/0110560 A1*    5/2011  Adhikari .............. G06V 10/764
382/103

(Continued)

FOREIGN PATENT DOCUMENTS

| EP | 2979156 | 2/2016 |
| KR | 20210045533 | 4/2021 |
| WO | 2014204755 | 12/2014 |

*Primary Examiner* — Amandeep Saini
(74) *Attorney, Agent, or Firm* — H.C. Park & Associates, PLC

(57) ABSTRACT

A method for controlling a mobile communication device using a user's distance specifying algorithm, the method comprises a first process of receiving an input image from a camera to generate first data; a second process of determining whether there is a candidate group that can be determined as a face using the first data and second data including a user's distance information; a third process of extracting, if there is a candidate group that can be determined as a face, from a plurality of third data including location information of the candidate group, fourth data having a minimum distance between a center of the first data and a center of the third data; and a fourth process of comparing the fourth data with a predetermined user's distance to determine whether it has a value within a tolerance range.

19 Claims, 10 Drawing Sheets

(51) Int. Cl.
*G06F 18/22* (2023.01)
*H04M 1/72454* (2021.01)
*H04M 1/724* (2021.01)
*H04N 23/611* (2023.01)

(52) U.S. Cl.
CPC ............ *G06V 40/18* (2022.01); *H04M 1/724* (2021.01); *H04N 23/611* (2023.01)

(58) Field of Classification Search
CPC ............ H04M 1/724; H04M 2250/52; H04M 1/72454; H04M 1/72448; H04N 5/23219; H04N 5/23229
USPC ........................................................ 382/103
See application file for complete search history.

(56) References Cited

U.S. PATENT DOCUMENTS

2016/0029883 A1 2/2016 Cox
2021/0117672 A1 4/2021 Kim et al.

* cited by examiner

METHOD FOR CONTROLLING MOBILE COMMUNICATION DEVICE, AND MOBILE COMMUNICATION DEVICE

CROSS-REFERENCE TO RELATED APPLICATION

This application claims priority from and the benefit of Korean Patent Application No. 10-2020-0047801 filed on Apr. 21, 2020, which is hereby incorporated by reference for all purposes as if fully set forth herein.

BACKGROUND

Field

Exemplary embodiments/implementations of the invention relate generally to a method for controlling a mobile communication device using a user's distance specifying algorithm, and a mobile communication device for performing the method.

Discussion of the Background

As a mobile communication terminal functionally advances, functions other than the wireless communication function, such as a camera function and a multimedia playback function, have been added to the mobile communication terminal beyond the conventional wireless communication means. These multimedia functions have already been commercialized and the application range thereof is being gradually expanded by improving a display portion of the mobile communication terminal and realizing high-speed communication. Therefore, the mobile communication terminal has been ultimately used as a portable entertainment system.

Among these multimedia functions, the camera function and the multimedia playback function are advanced functions that are gradually becoming popular. Along with the technological advancement of a digital camera, functions of the camera applied to the mobile communication terminal have also been greatly developed. With the technological advancement of the camera itself and the rapid development of the display portion for displaying images obtained through the camera, mobile phones equipped with the camera function are gradually becoming common.

The above information disclosed in this Background section is only for understanding of the background of the inventive concepts, and, therefore, it may contain information that does not constitute prior art.

SUMMARY

Methods according to exemplary implementations of the invention are capable of providing a method for controlling a mobile communication device using a user's distance specifying algorithm regardless of background changes.

Devices constructed according to exemplary embodiments of the invention are capable of providing a mobile communication device using a user's distance specifying algorithm regardless of background changes.

Additional features of the inventive concepts will be set forth in the description which follows, and in part will be apparent from the description, or may be learned by practice of the inventive concepts.

According to one or more exemplary embodiments, a method for controlling a mobile communication device using a user's distance specifying algorithm, the method comprises a first process of receiving an input image from a camera to generate first data; a second process of determining whether there is a candidate group that can be determined as a face using the first data and second data including a user's distance information; a third process of extracting, if there is a candidate group that can be determined as a face, from a plurality of third data including location information of the candidate group, fourth data having a minimum distance between a center of the first data and a center of the third data; and a fourth process of comparing the fourth data with a predetermined user's distance to determine whether it has a value within a tolerance range.

According to another embodiment, a mobile communication device using a user's distance specifying algorithm, comprises a camera; and a control unit configured to control an image input from the camera, wherein the control unit includes: a first controller configured to receive an input image from the camera and generate first data; a second controller configured to determine whether there is a candidate group that can be determined as a face using the first data and second data including a user's distance information; a third controller configured to extract, if there is a candidate group that can be determined as a face, from a plurality of third data including location information of the candidate group, fourth data having a minimum distance between a center of the first data and a center of the third data; and a fourth controller configured to compare the fourth data with a predetermined user's distance and determine whether it has a value within a tolerance range.

According to the method for controlling the mobile communication device using the user's distance specifying algorithm, and the mobile communication device in accordance with an exemplary embodiment of the present disclosure, it is possible to provide the user's distance specifying algorithm regardless of background changes.

The effects of the present disclosure are not limited to the aforementioned effects, and various other effects are included in the present specification.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
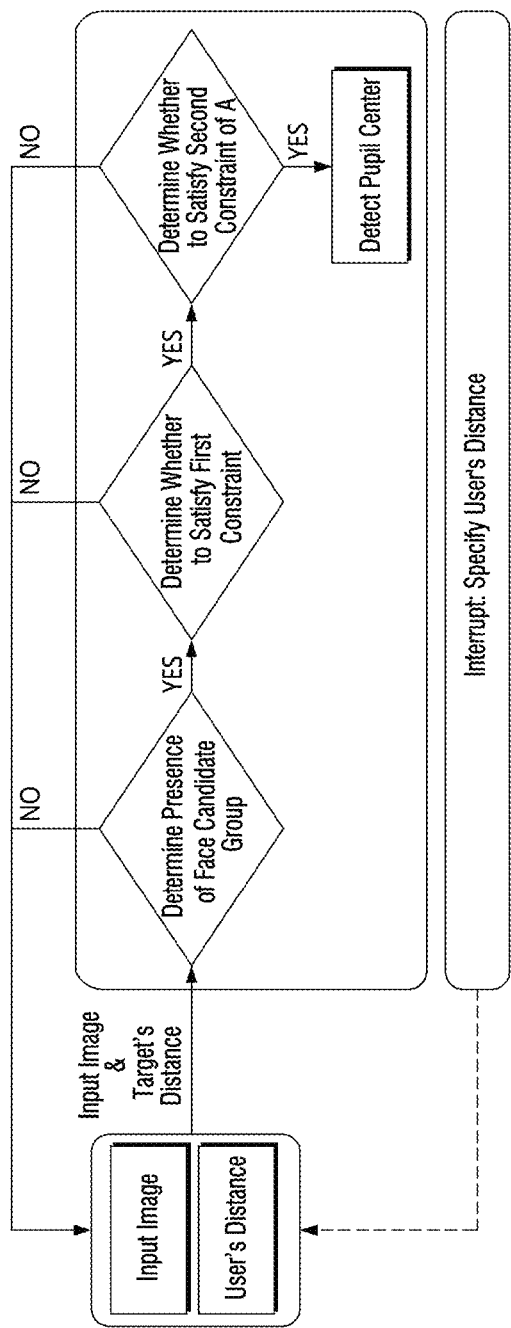
FIG. 1 is a flowchart of a method for controlling a mobile communication device using a user's distance specifying algorithm according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, regions, and/or aspects, etc. (hereinafter individually or collectively referred to as "elements"), of the various embodiments may be otherwise combined, separated, interchanged, and/or rearranged without departing from the inventive concepts.

In the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element or layer, it may be directly on, connected to, or coupled to the other element or layer or intervening elements may be present. When, however, an element is referred to as being "directly on," "directly connected to," or "directly coupled to" another element or layer, there are no intervening elements or layers present. To this end, the term "connected" may refer to physical, electrical, and/or optical connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
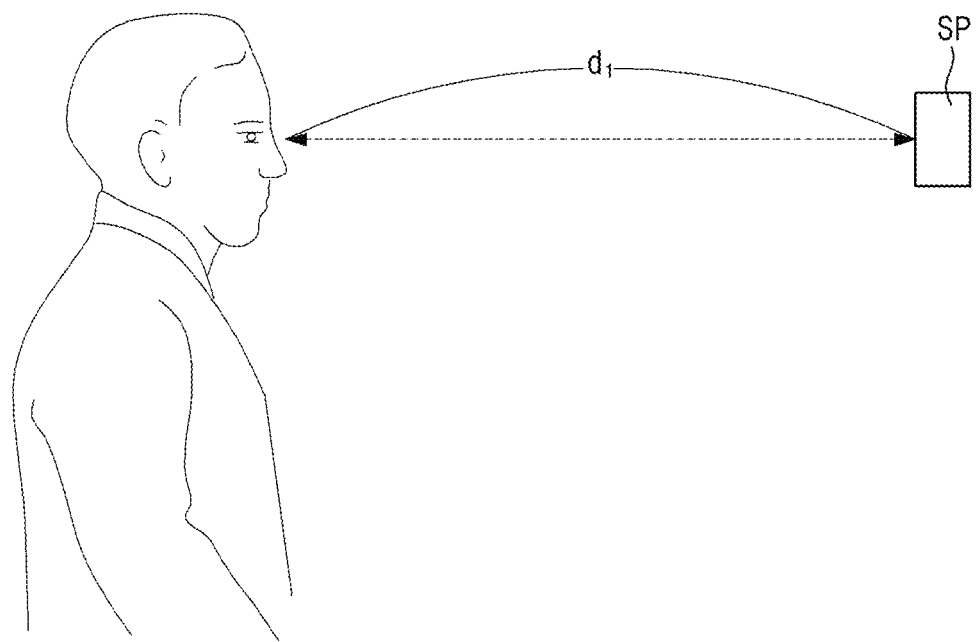
FIG. 2 is a schematic view illustrating the user's distance information set according to an exemplary embodiment.
Figure 3:
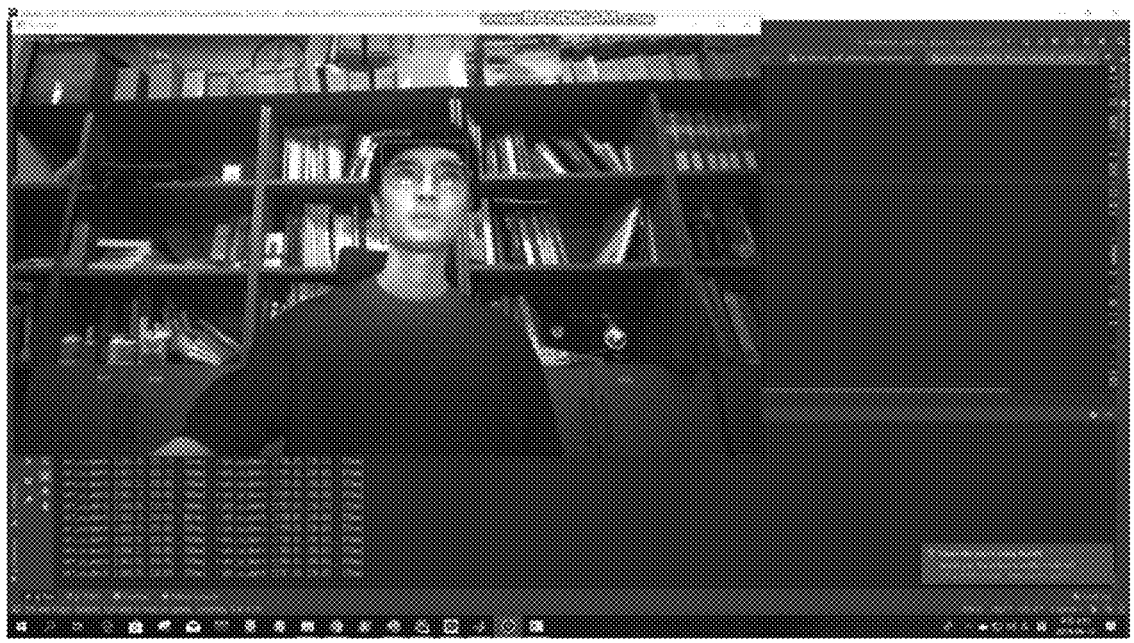
FIGS. 3 and 4 are images showing the user's distance information set according to an exemplary embodiment.
Figure 4:
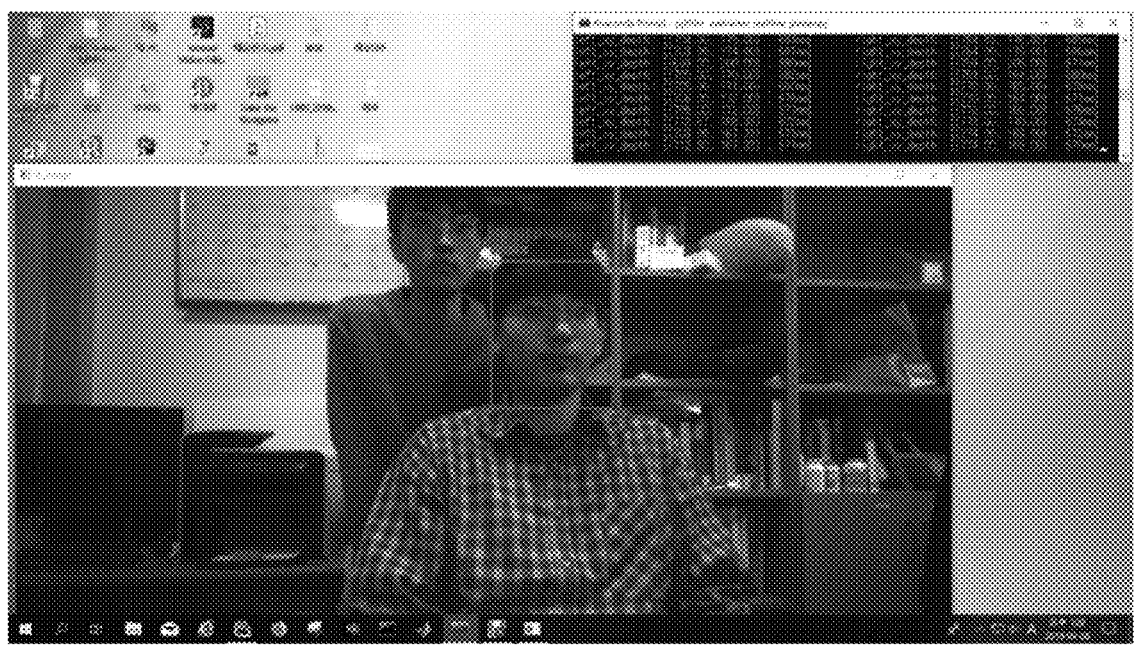
Figure 5:
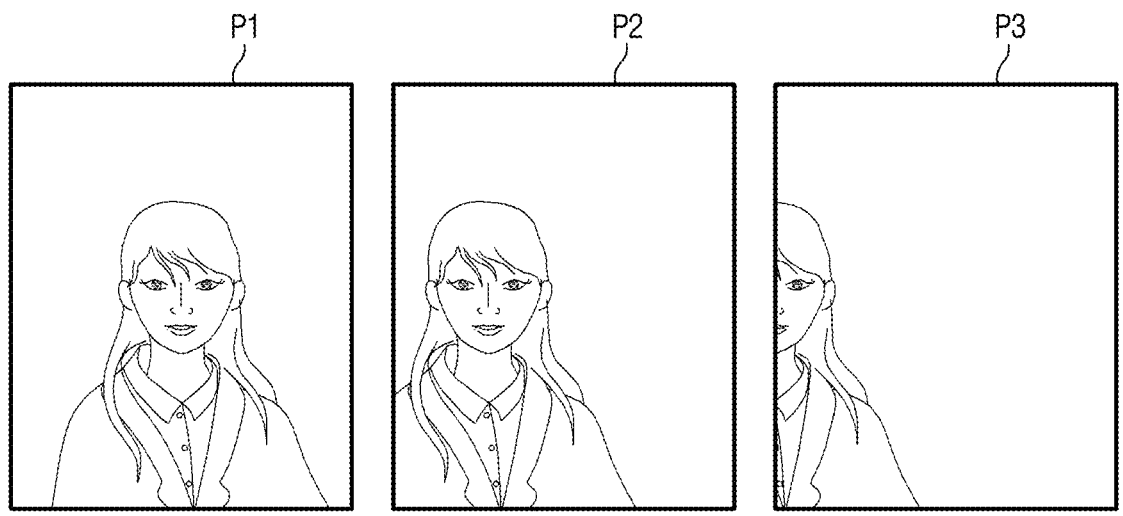
FIG. 5 illustrates images received from a camera according to a first process of an exemplary embodiment.
Figure 6:
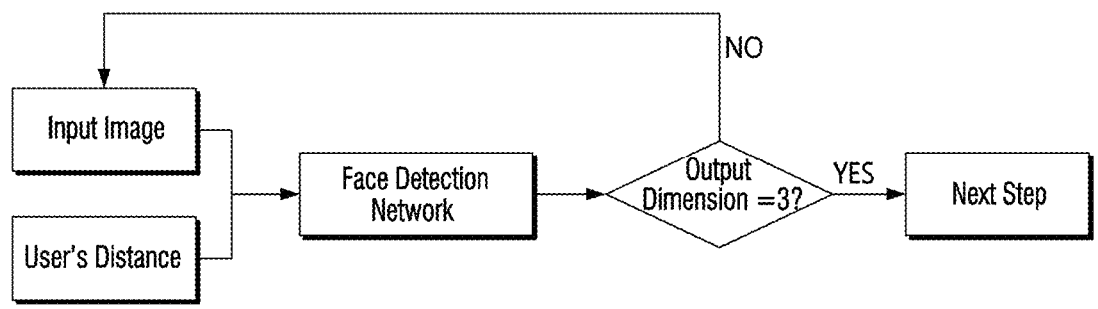
FIG. 6 is a flowchart illustrating a second process according to an exemplary embodiment.
Figure 7:
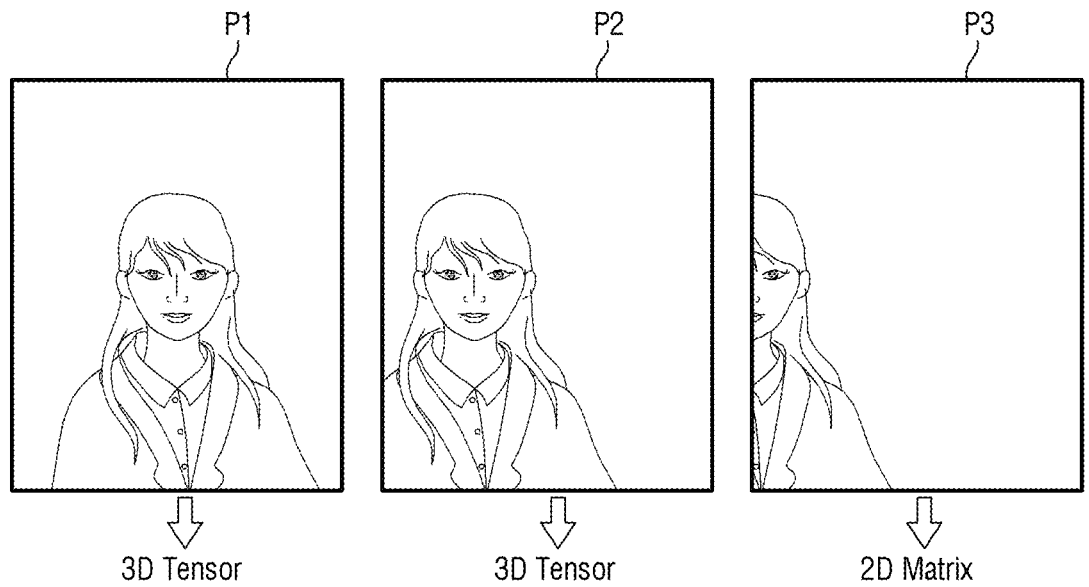
FIG. 7 illustrates determination of whether a target to be detected as a face is present or not in images input according to the second process of an exemplary embodiment.
Figure 8:
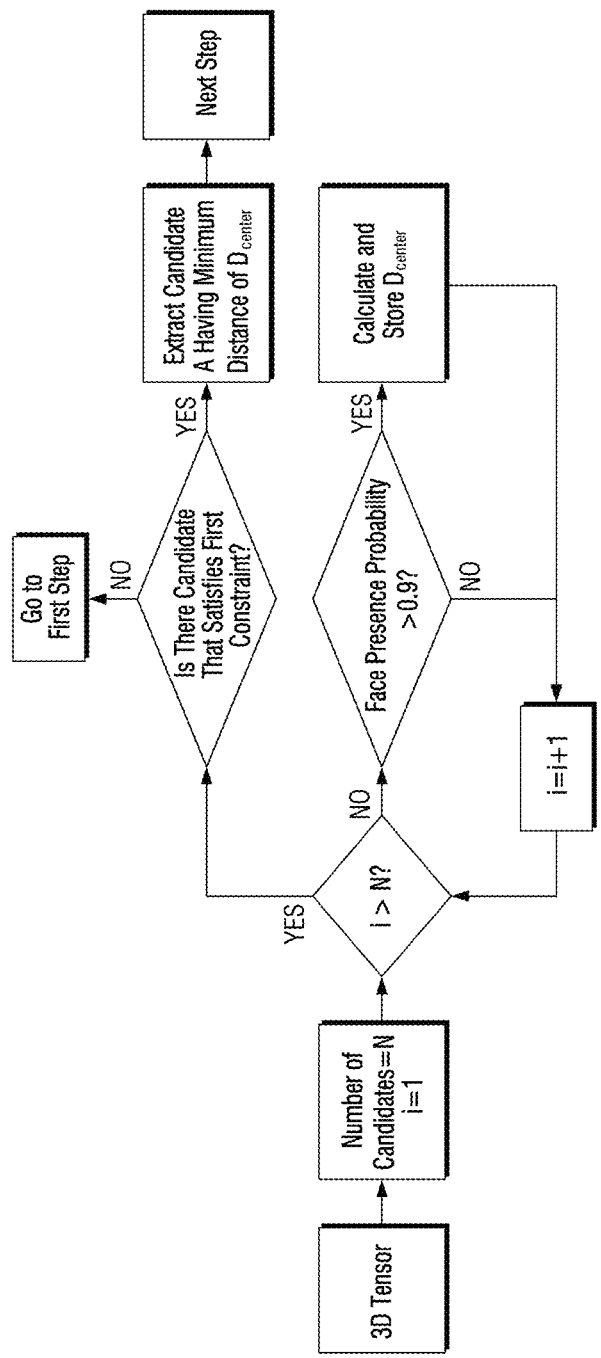
FIG. 8 is a flowchart representing a third process according to an exemplary embodiment.
Figure 9:
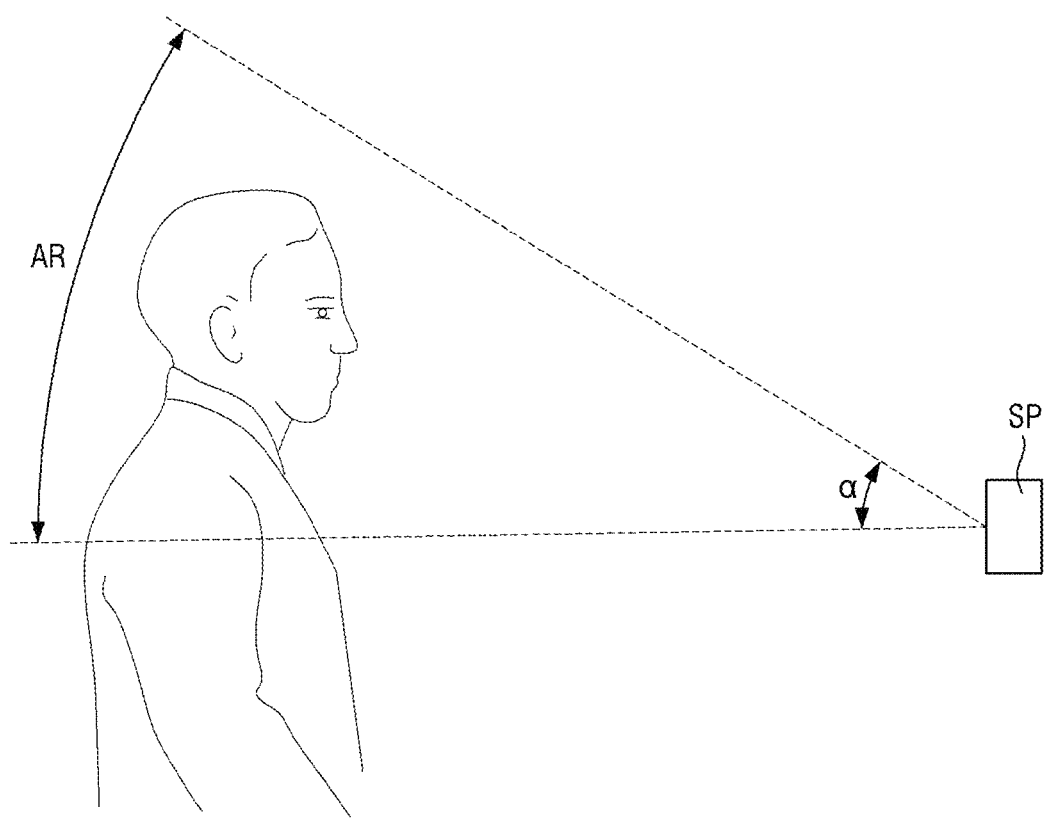
FIG. 9 is a view illustrating a first constraint of the third process according to an exemplary embodiment.
Figure 10:
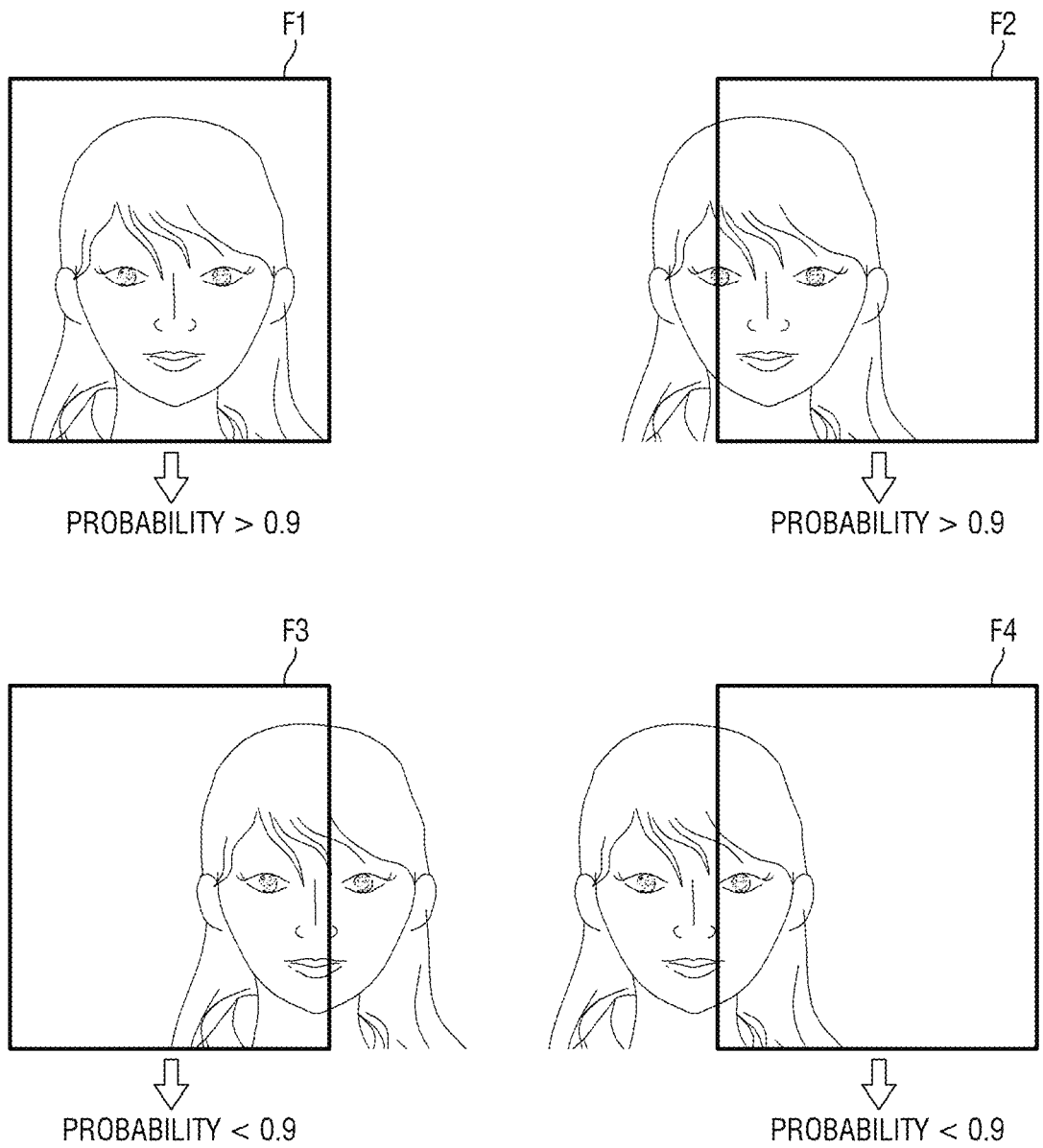
FIG. 10 illustrates extraction of fifth data according to the first constraint of an exemplary embodiment.
Figure 11:
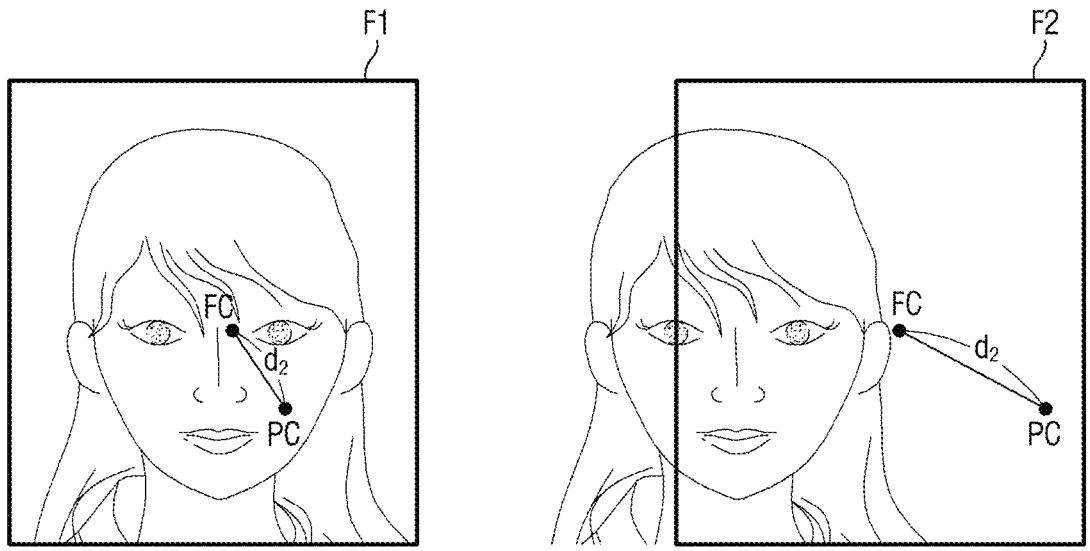
FIG. 11 illustrates extraction of fourth data from the fifth data extracted according to the third process of an exemplary embodiment.
Figure 12:
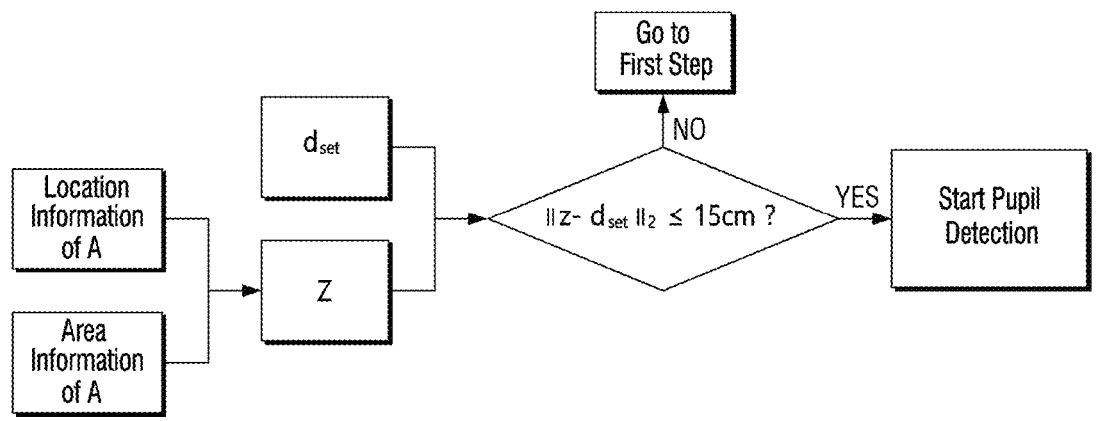
FIG. 12 is a flowchart representing a fourth process according to an exemplary embodiment.

FIG. 1 is a flowchart of a method for controlling a mobile communication device using a user's distance specifying algorithm according to an exemplary embodiment. FIG. 2 is a schematic view illustrating the user's distance information set according to an exemplary embodiment. FIGS. 3 and 4 are pictures showing the user's distance information set according to an exemplary embodiment. FIG. 5 illustrates images received from a camera according to a first process of an exemplary embodiment. FIG. 6 is a flowchart illustrating a second process according to an exemplary embodiment. FIG. 7 illustrates determination of whether a target to be detected as a face is present or not in images input according to the second process of an exemplary embodiment. FIG. 8 is a flowchart representing a third process according to an exemplary embodiment. FIG. 9 is a view illustrating a first constraint of the third process according to an exemplary embodiment. FIG. 10 illustrates extraction of fifth data according to the first constraint of an exemplary embodiment. FIG. 11 illustrates extraction of fourth data from the fifth data extracted according to the third process of an exemplary embodiment. FIG. 12 is a flowchart representing a fourth process according to an exemplary embodiment.

Referring to FIGS. 1 to 12, in the method for controlling the mobile communication device using the user's distance specifying algorithm according to an exemplary embodiment, the first to fourth processes, which will be described later, are carried out so that an eye tracking technique can be implemented without regard to the surrounding background. Further, the constraints may respectively be added to the second and third processes among the processes, thereby achieving a more reliable eye tracking technique. In addition, among data to be input to the first process, since data related to the user's distance can be simply specified by a keyboard operation, it is possible to improve simplicity as well as the reliability.

Referring to FIGS. 1 and 2, the first process according to an exemplary embodiment may generate first data by receiving images through a sensor unit SP.

The sensor unit SP may include a camera.

The first process may operate the sensor unit SP to target a user and receive the user's image, thereby generating the first data.

Before performing the first process, second data including the user's distance information may be generated. The second data may include a distance d1 between the user and the sensor unit SP. The distance d1 between the user and the sensor unit SP may simply be generated as the second data through an interrupt by using an input unit such as a keyboard or the like. More specifically, when the distance d1 between the sensor unit SP and the user is derived and input by the sensor unit SP, the distance d1 between the sensor unit SP and the user is input through the input unit, thereby generating the second data.

In some embodiments, the second data may be generated after performing the first process.

In some embodiments, the second data may be generated simultaneously with performing the first process.

FIGS. 3 and 4 illustrate that the distance d1 between the user and the sensor unit SP is derived. When the distance d1 between the user and the sensor unit SP is derived, the distance d1 between the user and the sensor unit SP is input through the input unit, thereby generating the second data.

FIG. 5 illustrates first data P1, P2, and P3 that is generated based on the images input from the sensor unit SP according to the first process of an exemplary embodiment. In FIG. 5, only a case where the number of the first data P1 to P3 is three has been illustrated, but the present disclosure is not limited thereto. The number of the first data may be more than three or less than three.

Then, referring to FIGS. 1 and 6, the second process determines whether a candidate group that can be determined as a face is present or not by using the first data and the second data including the user's distance information.

The second process may be carried out through a face detection network.

The face detection network may determine whether a target that can be detected as a face is present or not in the first data by using data previously stored in the mobile communication device.

In a step of determining whether a target that can be detected as a face is present or not in the input image, if it is determined that the target that can be detected as a face is present in the input image through the face detection network, a three-dimensional (3D) tensor may be output. If it is determined that the target that can be detected as a face is not present, a two-dimensional (2D) matrix may be output.

When the 2D matrix is output through the second process, the process may return to the first process again. In other words, when the 2D matrix is output through the second process, the first process may operate the sensor unit SP to target the user, receive the user's image and proceed with the step of generating the first data.

Further, as described above, the second data including the user's distance information may be generated before performing the first process. The second data may include the distance d1 between the user and the sensor unit SP. The distance d1 between the user and the sensor unit SP may simply be generated as the second data through the interrupt by using the input unit such as a keyboard or the like. More specifically, when the distance d1 between the sensor unit SP and the user is derived and input by the sensor unit SP, the distance d1 between the sensor unit SP and the user is input through the input unit, thereby generating the second data.

In some embodiments, the second data may be generated after performing the first process.

In some embodiments, the second data may be generated concurrently with performing the first process.

As illustrated in FIG. 7, it is determined whether the candidate group that can be determined as a face is present or not among the first data P1 to P3 generated based on the images input from the sensor unit SP according to the first process of an exemplary embodiment, by using the first data and the second data including the user's distance information. If the candidate group (data P1 and P2) that can be determined as a face is present, the 3D tensor may be output. It is determined whether the candidate group that can be determined as a face is present or not by using the second data, and if a candidate (data P3) that cannot be determined as a face is present, the 2D matrix may be output.

By determining whether the candidate group that can be determined as a face is present or not by using the first data and the second data including the user's distance information, the data P1 and P2 may be determined as the candidate group that can be determined as a face and may be referred to as third data below.

Then, referring to FIGS. 1 and 8 to 11, in the third process, if there is the candidate group that can be determined as a face, fourth data having the minimum of distances between a center PC of the first data and centers FC of the third data may be extracted from the third data P1 and P2 including the location information of the candidate group.

More specifically, the third process may extract fifth data whose face presence probability is more than 90% from the third data P1 and P2.

FIG. 10 illustrates that the fifth data is extracted based on the third data P1 among the third data P1 and P2.

Referring to FIG. 10, frames having a face presence probability greater than 90% may be extracted as the fifth data from a plurality of frames F1 to F4 of the third data P1.

Referring to FIG. 8, after extracting the fifth data, a distance d2 between a center PC of the third data and a center FC of each of the fifth data may be extracted (see FIG. 11).

As illustrated in FIG. 8, it is determined whether the face presence probability of the frames F1 to F4 of the third data P1 exceeds 90% or not, and then a first constraint is reviewed only for the extracted fifth data.

The first constraint may be whether the user's face is present within a lateral angle of a degrees with respect to the center of the first data, as shown in FIG. 9. In other words, the user's face may be present in the fifth data extracted from the frames F1 to F4 of the third data P1 described above, and the center of the first data may be set on the basis of, for example, the sensor unit SP.

The a degrees may be, for example, 15 degrees, but the present disclosure is not limited thereto.

From the fifth data (frames F1 to F4), data that satisfies the first constraint may be extracted as the fourth data. The fourth data may include not only image information but also the distance d2 between the center PC of the third data and the center FC of each of the fourth data. For example, among the fifth data (frames F1 to F4), the first and second frames F1 and F2 that satisfy the first constraint may be extracted as the fourth data.

If all of the fifth data (frames F1 to F4) does not satisfy the first constraint, the process may return to the second process again.

In other words, if all of the fifth data (frames F1 to F4) does not satisfy the first constraint, the process may return to the second process to perform the step of determining whether the candidate group that can be determined as a face is present or not by using the first data and the second data including the user's distance information. As described above, the second process may be carried out through the face detection network. The face detection network may determine whether the target to be detected as a face is present or not in the first data by using the data previously stored in the mobile communication device.

In the step of determining whether the target that can be detected as a face is present or not in the input image, if it is determined that the target that can be detected as a face present in the input image through the face detection network, the 3D tensor may be output. If it is determined that the target that can be detected as a face is not present, the 2D matrix may be output.

When the 2D matrix is output through the second process, the process may return to the first process again. In other words, when the 2D matrix is output through the second process, the first process may operate the sensor unit SP to target the user, receive the user's image and proceed with the step of generating the first data.

Further, as described above, the second data including the user's distance information may be generated before performing the first process. The second data may include the distance d1 between the user and the sensor unit SP. The distance d1 between the user and the sensor unit SP may simply be generated as the second data through the interrupt by using the input unit such as a keyboard or the like. More specifically, when the distance d1 between the sensor unit SP and the user is derived and input by the sensor unit SP, the distance d1 between the sensor unit SP and the user is input through the input unit, thereby generating the second data.

Then, a candidate may be extracted from the fourth data, the candidate having the minimum of the distances d2 between the center PC of the third data and the centers FC of the respective fourth data. In the following description, the candidate having the minimum of the distances d2 between the center PC of the third data and the centers FC of the respective fourth data is referred to as extracted fourth data.

Subsequently, referring to FIG. 12, a fourth process may determine whether the extracted fourth data has a value within a tolerance range or not by comparing with a predetermined user's distance.

More specifically, in the fourth process, a median of the extracted fourth data may be calculated to be determined as the user's distance z. Then, it is possible to determine whether the user's distance z is within a tolerance range t or not by using Eq. 1 below.

$$\sqrt{(z-d\text{set})^2} \leq t \qquad \text{Eq. 1}$$

In Eq. 1, z may be the median of the extracted fourth data, dset may be the predetermined user's distance, and t may be the tolerance range.

The tolerance range may be, for example, 15 cm.

Through the fourth process, a pupil center may be detected based on the extracted fourth data satisfying Eq. 1.

If the extracted fourth data does not satisfy Eq. 1, the process may return to the first process.

In other words, if the extracted fourth data does not satisfy Eq. 1, the sensor unit SP may be operated to target the user and receive the user's image, and the step of generating the first data may be performed again.

Further, as described above, the second data including the user's distance information may be generated before performing the first process. The second data may include the distance d1 between the user and the sensor unit SP. The distance d1 between the user and the sensor unit SP may simply be generated as the second data through the interrupt by using the input unit such as a keyboard or the like. More specifically, when the distance d1 between the sensor unit SP and the user is derived and input by the sensor unit SP, the distance d1 between the sensor unit SP and the user is input through the input unit, thereby generating the second data.

According to a method for controlling the mobile communication device using a user's distance specifying algorithm according to an exemplary embodiment, the second data including the user's distance information may be generated before performing the first process, as described above. The second data may simply be generated through the interrupt by using the input unit such as a keyboard or the like, and may be set at any time while the above-described algorithm proceeds.

Further, before detecting the pupil center, the user's location may effectively be specified by using spatial information that may easily be acquired by, for example, inputting an image through the sensor unit SP (first process); determining whether the face candidate group is present or not (second process); extracting the fifth data having the face presence probability more than 90% from the plurality of the third data (third process); determining whether or not the user's face is present within the lateral angle of a degrees with respect to the center of the first data (first constraint); and calculating the median of the extracted fourth data, determining the median as the user's distance z, and determining whether the user's distance z has a value within the tolerance range t or not using Eq. 1 (fourth process, second constraint).

Furthermore, in the first to fourth processes, the input corresponding to the background (or noise) is easily removed except for the user by using the first and second constraints, thereby minimizing or eliminating interference caused by surrounding background elements.

Hereinafter, a mobile communication device according to an exemplary embodiment will be described. In the following embodiment, the same components as those of the above-described embodiment are denoted by the same reference numerals, and a description thereof will be omitted or simplified.

Figure 13:
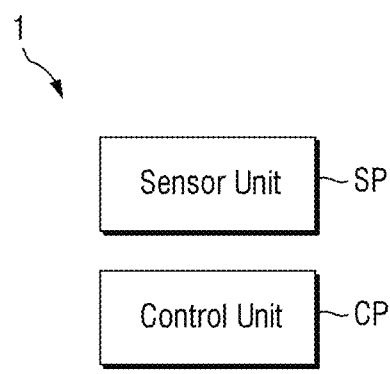
FIG. 13 is a block diagram illustrating a mobile communication device according to an exemplary embodiment.

FIG. 13 is a block diagram illustrating a mobile communication device according to an exemplary embodiment.

Referring to FIGS. 1 to 13, a mobile communication device 1 according to an exemplary embodiment may include the sensor unit SP and a control unit CP. The sensor unit SP may include the camera described above. The control unit CP may include first to fourth controllers.

The mobile communication device using a user's distance specifying algorithm according to an exemplary embodiment may include the first to fourth controllers, which will be described later, such that an eye tracking technique can be implemented without regard to the surrounding background. Further, each of the second controller and the third controller may add a constraint, thereby achieving a more reliable eye tracking technique. In addition, since data related to the user's distance, which is input to the first controller, can be simply specified by a keyboard operation, it is possible to improve simplicity as well as the reliability.

Referring to FIGS. 1 to 13, the first controller according to an exemplary embodiment may perform the first process described above. The first controller may receive an image from the sensor unit SP to generate the first data. The sensor unit SP may include the camera. The first controller may operate the sensor unit SP to target a user, receive the user's image and generate the first data.

Before performing the first process, the first controller may generate second data including the user's distance information. The second data may include a distance $d_1$ between the user and the sensor unit SP. The distance $d_1$ between the user and the sensor unit SP may simply be generated as the second data through an interrupt by using an input unit such as a keyboard or the like. More specifically, when the distance $d_1$ between the sensor unit SP and the user is derived and input by the sensor unit SP, the distance $d_1$ between the sensor unit SP and the user is input through the input unit, thereby generating the second data.

In some embodiments, the second data may be generated after the first controller performs the first process.

In some embodiments, the second data may be generated simultaneously while the first controller performs the first process).

The second controller performs the second process. The second controller determines whether the candidate group that can be determined as a face is present or not by using the first data and the second data including the user's distance information.

The second controller may perform the second process through the face detection network.

The face detection network may determine whether a target that can be detected as a face is present or not in the first data by using data previously stored in the mobile communication device.

In the step of determining whether the target that can be detected as a face is present or not in the input image, if it is determined that the target that can be detected as a face is present in the input image through the face detection network, the 3D tensor may be output. If it is determined that the target that can be detected as a face is not present, the 2D matrix may be output.

When the 2D matrix is output by the second controller, the process may return to the first controller again. In other words, when the 2D matrix is output by the second controller, the first controller may operate the sensor unit SP to target the user, receive the user's image and proceed with the step of generating the first data.

Further, as described above, the second data including the user's distance information may be generated before performing the first process. The second data may include the distance $d_1$ between the user and the sensor unit SP. The distance $d_1$ between the user and the sensor unit SP may simply be generated as the second data through the interrupt by using the input unit such as a keyboard or the like. More specifically, when the distance $d_1$ between the sensor unit SP and the user is derived and input by the sensor unit SP, the distance $d_1$ between the sensor unit SP and the user is input through the input unit, thereby generating the second data.

It is determined whether the candidate group that can be determined as a face is present or not among the first data P1 to P3 generated based on the images input from the sensor unit SP according to the first controller of an exemplary embodiment, by using the first data and the second data including the user's distance information. If the candidate group (data P1 and P2) that can be determined as a face is present, the 3D tensor may be output. It is determined whether the candidate group that can be determined as a face is present or not by using the second data, and if a candidate (data P3) that cannot be determined as a face is present, the 2D matrix may be output.

By determining whether the candidate group that can be determined as a face is present or not by using the first data and the second data including the user's distance information, the data P1 and P2 may be determined as the candidate group that can be determined as a face and may be referred to as third data below.

The third controller may perform the third process. If there is the candidate group that can be determined as a face, the third controller may extract fourth data having the minimum of distances between a center PC of the first data and centers FC of the third data from the third data P1 and P2 including the location information of the candidate group.

More specifically, the third controller may extract fifth data whose face presence probability is more than 90% from the third data P1 and P2.

After extracting the fifth data, the third controller may extract a distance d2 between a center PC of the third data and a center FC of each of the fifth data (see FIG. 11).

The third controller may determine whether the face presence probability of the frames F1 to F4 of the third data P1 exceeds 90% or not, and then review a first constraint only for the extracted fifth data.

The first constraint may be whether the user's face is present within a lateral angle of a degrees with respect to the center of the first data, as shown in FIG. 9. In other words, the user's face may be present in the fifth data extracted from the frames F1 to F4 of the third data P1 described above, and the center of the first data may be set on the basis of, for example, the sensor unit SP.

The a degrees may be, for example, 15 degrees, but the present disclosure is not limited thereto.

The third controller may extract data that satisfies the first constraint as the fourth data from the fifth data (frames F1 to F4). The fourth data may include not only image information but also the distance d2 between the center PC of the third data and the center FC of each of the fourth data. For example, among the fifth data (frames F1 to F4), the first and second frames F1 and F2 that satisfy the first constraint may be extracted as the fourth data.

If all of the fifth data (frames F1 to F4) does not satisfy the first constraint, the process may return to the second controller again.

In other words, if all of the fifth data (frames F1 to F4) does not satisfy the first constraint, the process may return to the second controller to perform the step of determining whether the candidate group that can be determined as a face is present or not by using the first data and the second data including the user's distance information. As described above, the second controller may perform the second process through the face detection network. The face detection network may determine whether a target that can be detected as a face is present or not in the first data by using data previously stored in the mobile communication device.

In the step of determining whether the target that can be detected as a face is present or not in the input image, if it is determined that the target that can be detected as a face is present in the input image through the face detection network, the 3D tensor may be output. If it is determined that the target that can be detected as a face is not present, the 2D matrix may be output.

When the 2D matrix is output by the second controller, the process may return to the first controller again. In other words, when the 2D matrix is output by the second controller, the first controller may operate the sensor unit SP to target the user, receive the user's image and proceed with the step of generating the first data.

Further, as described above, the second data including the user's distance information may be generated before the first controller performs the first process. The second data may include the distance d1 between the user and the sensor unit SP. The distance d1 between the user and the sensor unit SP may simply be generated as the second data through the interrupt by using the input unit such as a keyboard or the like. More specifically, when the distance d1 between the sensor unit SP and the user is derived and input by the sensor unit SP, the distance d1 between the sensor unit SP and the user is input through the input unit, thereby generating the second data.

Then, the third controller may extract a candidate from the fourth data, the candidate having the minimum of the distances d2 between the center PC of the third data and the centers FC of the respective fourth data.

The fourth controller may perform the fourth process. The fourth controller may compare the extracted fourth data with a predetermined user's distance to determine whether it has a value within a tolerance range.

More specifically, the fourth controller may calculate a median of the extracted fourth data and determine the median as the user's distance z. Then, it is possible to determine whether the user's distance z is within a tolerance range t or not by using Eq. 1 below.

$$\sqrt{(z-d\text{set})^2} \leq t \qquad \text{Eq. 1}$$

In Eq. 1, z may be the median of the extracted fourth data, dset may be the predetermined user's distance, and t may be the tolerance range.

The tolerance range may be, for example, 15 cm.

Through the fourth controller, a pupil center may be detected based on the extracted fourth data satisfying Eq. 1.

If the extracted fourth data does not satisfy Eq. 1, the process may return to the first controller again to perform the first process.

In other words, if the extracted fourth data does not satisfy Eq. 1, the sensor unit SP may be operated to target the user and receive the user's image, and the step of generating the first data may be performed again.

Further, as described above, the second data including the user's distance information may be generated before performing the first process. The second data may include a distance d1 between the user and the sensor unit SP. The distance d1 between the user and the sensor unit SP may simply be generated as the second data through an interrupt by using the input unit such as a keyboard or the like. More specifically, when the distance d1 between the sensor unit SP and the user is derived and input by the sensor unit SP, the distance d1 between the sensor unit SP and the user is input through the input unit, thereby generating the second data.

According to the mobile communication device using the user's distance specifying algorithm according to an exemplary embodiment, the second data including the user's distance information may be generated before performing the first process, as described above. The second data may simply be generated through the interrupt by using the input unit such as a keyboard or the like, and may be set at any time while the above-described algorithm proceeds.

Further, before detecting the pupil center, the user's location may effectively be specified by using spatial information that may easily be acquired by, for example, inputting an image through the sensor unit SP (first controller); determining whether the face candidate group is present or not (second controller); extracting the fifth data having the face presence probability more than 90% from the plurality of the third data (third controller); determining whether or not the user's face is present within the lateral angle of a degrees with respect to the center of the first data (first constraint); and calculating the median of the extracted fourth data, determining the median as the user's distance z, and determining whether the user's distance z has a value within the tolerance range t or not using Eq. 1 (fourth controller, second constraint).

Furthermore, in the first to fourth controllers, the input corresponding to the background (or noise) is easily removed except for the user by using the first and second constraints, thereby minimizing or eliminating interference caused by surrounding background elements.

Although embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling a mobile communication device using a user's distance specifying algorithm to detect a pupil center of an eye of the user, the method being implemented by a camera and a control unit comprising a first controller, a second controller, a third controller, and a fourth controller, the method comprising:
   a first process, by the first controller, of receiving an input image from the camera to generate a first data;
   a second process of determining, by the second controller, whether there is a candidate group that can be determined as a face using the first data and a second data including a user's distance information generated by the user as an interrupt using a keyboard;
   a third process of extracting, by the third controller, if there is a candidate group that can be determined as a face, from a plurality of a third data including location information of the candidate group, a fourth data having a minimum distance between a center of the first data and a center of the third data; and
   a fourth process of using the fourth data to determine a user's distance (z) and comparing, by the fourth controller, the user's distance (z) with a predetermined user's distance to determine whether the user's distance (z) has a value within a tolerance range,
   wherein, when the value of the user's distance (z) is within the tolerance range, the pupil center of the eye of the user is detected.

2. The method of claim 1, wherein the second process is performed, by the second controller, through a face detection network, and includes a step of determining whether there is a target that can be detected as a face in the input image.

3. The method of claim 2, wherein in the step of determining, by the second controller, whether there is a target that can be detected as a face in the input image, a three-dimensional (3D) tensor is outputted if the target that can be detected as a face is present in the input image, and a two-dimensional (2D) matrix is outputted if the target that can be detected as a face is not present in the input image.

4. The method of claim 3, wherein when the 2D matrix is outputted, it is configured to return to the first process again.

5. The method of claim 4, wherein the third process includes:
   extracting, by the third controller, a fifth data having a face presence probability greater than 90% from the plurality of third data, and
   extracting a distance between a center of each of the fifth data and a center of the third data.

6. The method of claim 5, wherein the third process includes:
   extracting, by the third controller, the fifth data having a face presence probability greater than 90% from the plurality of third data, and
   extracting the fourth data after the step of extracting the distance between the center of each of the fifth data and the center of the third data.

7. The method of claim 6, wherein the third process includes:
   extracting, by the third controller, the fifth data having a face presence probability greater than 90% from the plurality of the third data,
   extracting a candidate that satisfies a first constraint from the fifth data between the step of extracting the distance between the center of each of the fifth data and the center of the third data and the step of extracting the fourth data, and
   extracting the fourth data from the extracted data.

8. The method of claim 7, wherein the first constraint is that a target's face is present within a lateral angle of 15 degrees with respect to the center of the first data.

9. The method of claim 8, wherein a candidate that does not satisfy the first constraint among the fifth data is configured to return to the second process again.

10. The method of claim 9, wherein the fourth process includes:
    calculating, by the fourth controller, a median of the fourth data to determine the median as the user's distance (z), and
    determining whether the user's distance (z) has a value within the tolerance range (t) using the following Eq. 1:

$$\sqrt{(z-d\text{set})^2} \leq t \qquad \text{Eq. 1.}$$

11. The method of claim 10, wherein the tolerance range (t) is 15 cm.

12. A mobile communication device using a user's distance specifying algorithm to detect a pupil center of an eye of the user, comprising:
    a camera; and
    a control unit configured to control an image input from the camera, wherein the control unit includes:
    a first controller configured to receive an input image from the camera and generate a first data;
    a second controller configured to determine whether there is a candidate group that can be determined as a face using the first data and a second data including a user's distance information generated by the user as an interrupt using a keyboard;
    a third controller configured to extract, if there is a candidate group that can be determined as a face, from a plurality of a third data including location information of the candidate group, a fourth data having a minimum distance between a center of the first data and a center of the third data; and
    a fourth controller configured to use the fourth data to determine a user's distance (z) and compare the user's distance (z) with a predetermined user's distance and determine whether the user's distance (z) has a value within a tolerance range,
    wherein, when the value of the user's distance (z) is within the tolerance range, the pupil center of the eye of the user is detected.

13. The mobile communication device of claim 12, wherein the second controller performs the determination through a face detection network, and determines whether there is a target that can be detected as a face in the input image.

14. The mobile communication device of claim 13, wherein when the second controller determines whether there is a target that can be detected as a face in the input image, a three-dimensional (3D) tensor is outputted if the target that can be detected as a face is present in the input image, and a two-dimensional (2D) matrix is outputted if the target that can be detected as a face is not present in the input image.

15. The mobile communication device of claim 14, wherein when the 2D matrix is outputted, it is configured to return to the first controller again.

16. The mobile communication device of claim 15, wherein the third controller extracts a fifth data having a face presence probability greater than 90% from the plurality of the third data, and
　extracts a distance between a center of each of the fifth data and a center of the third data.

17. The mobile communication device of claim 16, wherein the third controller extracts the fifth data having a face presence probability greater than 90% from the plurality of the third data, and
　extracts the fourth data after extracting the distance between the center of each of the fifth data and the center of the third data.

18. The mobile communication device of claim 17, wherein the third controller extracts the fifth data having a face presence probability greater than 90% from the plurality of the third data, extracts a candidate that satisfies a first constraint from the fifth data between the step of extracting the distance between the center of each of the fifth data and the center of the third data and the step of extracting the fourth data, and extracts the fourth data from the extracted data,
　wherein the first constraint is that a target's face is present within a lateral angle of 15 degrees with respect to the center of the first data, and
　wherein a candidate that does not satisfy the first constraint among the fifth data is configured to return to the second controller again.

19. The mobile communication device of claim 18, wherein the fourth controller calculates a median of the fourth data and determines the median as the user's distance (z), and determines whether the user's distance (z) has a value within the tolerance range (t) using the following Eq. 1:

$$\sqrt{(z-d\text{set})^2} \leq t \qquad \text{Eq. 1.}$$

* * * * *